No. 884,263. PATENTED APR. 7, 1908.
H. W. BUCHANAN.
MACHINE FOR STAMPING ENVELOPS.
APPLICATION FILED APR. 11, 1907.
3 SHEETS—SHEET 1.
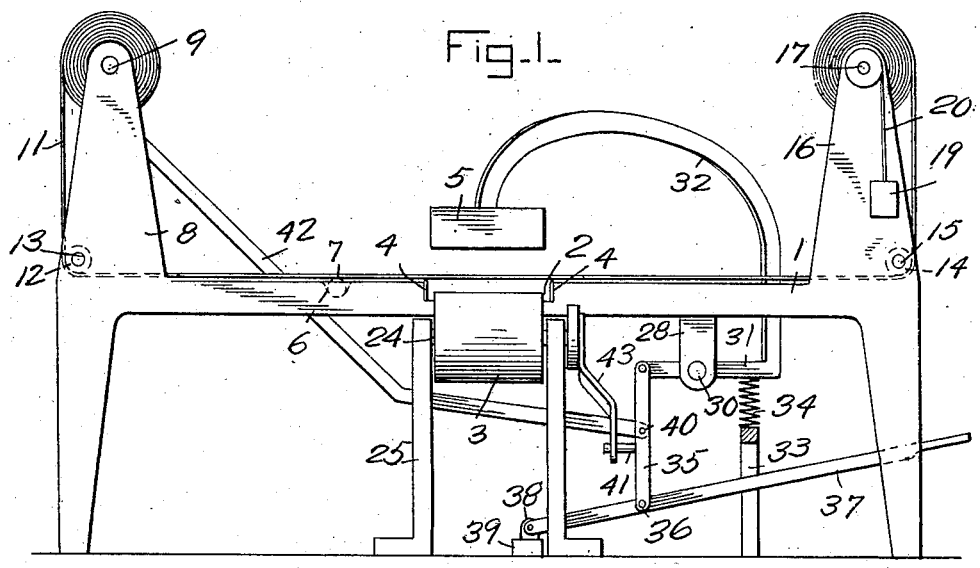
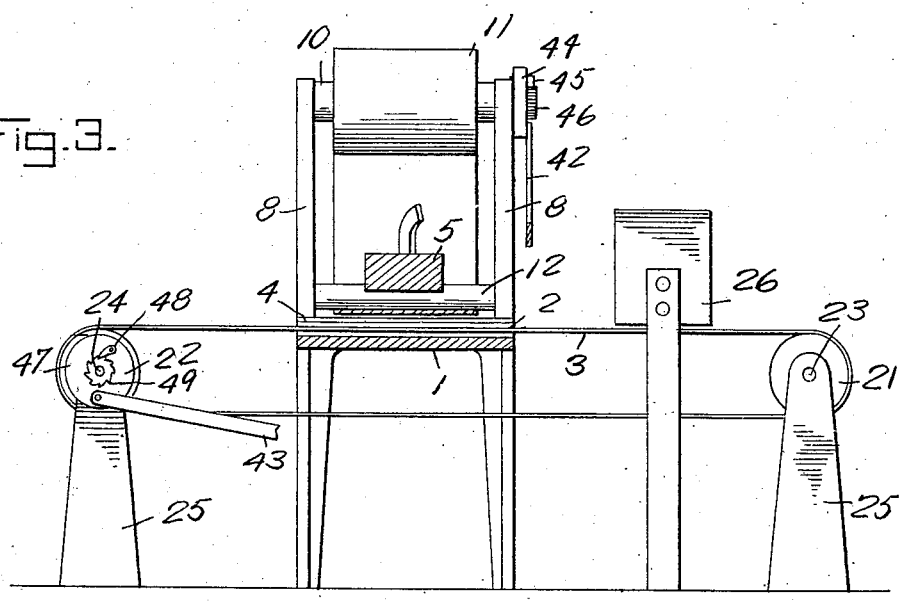
Witnesses
G. R. Thomas
Inventor
H. W. Buchanan
By Chandler & Chandler
Attorneys No. 884,263. PATENTED APR. 7, 1908.
H. W. BUCHANAN.
MACHINE FOR STAMPING ENVELOPS.
APPLICATION FILED APR. 11, 1907.
3 SHEETS—SHEET 2.
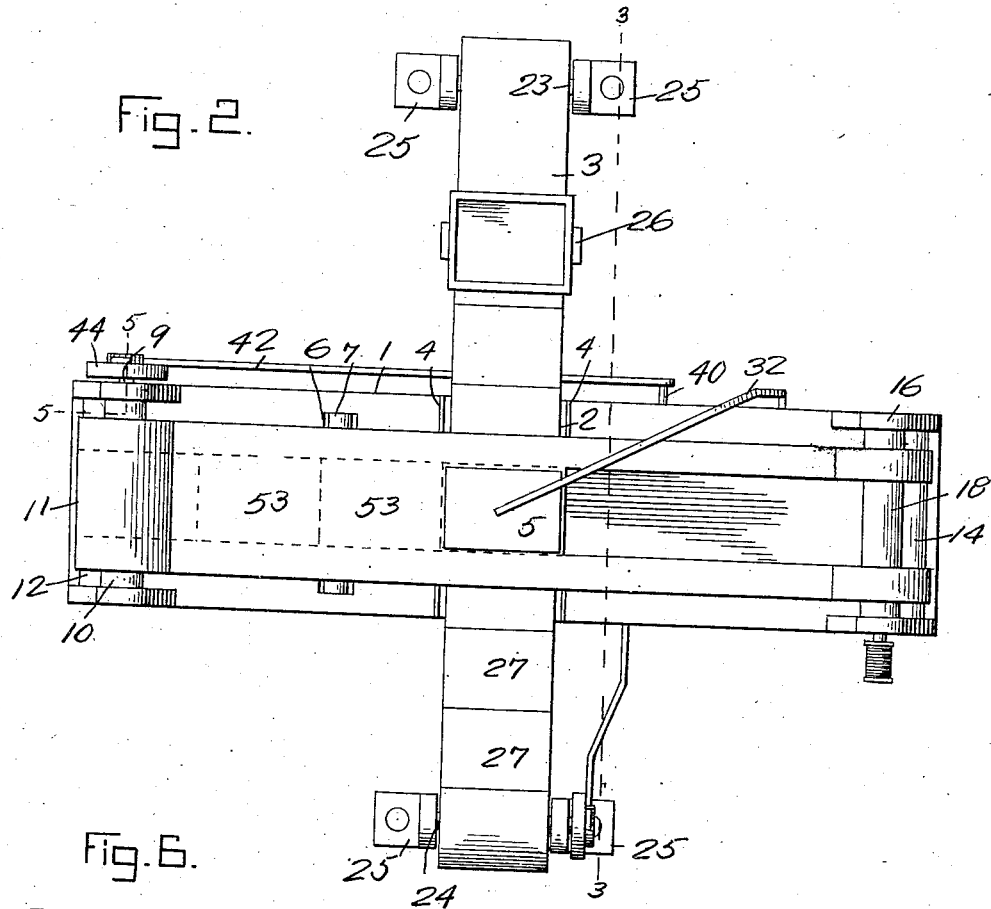
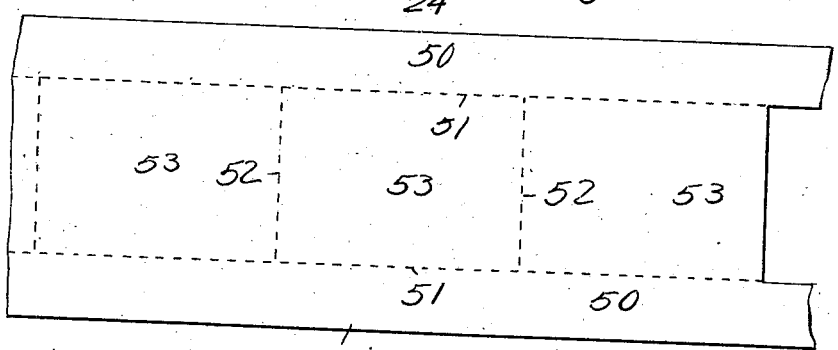

No. 884,263. PATENTED APR. 7, 1908.
H. W. BUCHANAN.
MACHINE FOR STAMPING ENVELOPS.
APPLICATION FILED APR. 11, 1907.
3 SHEETS—SHEET 3.
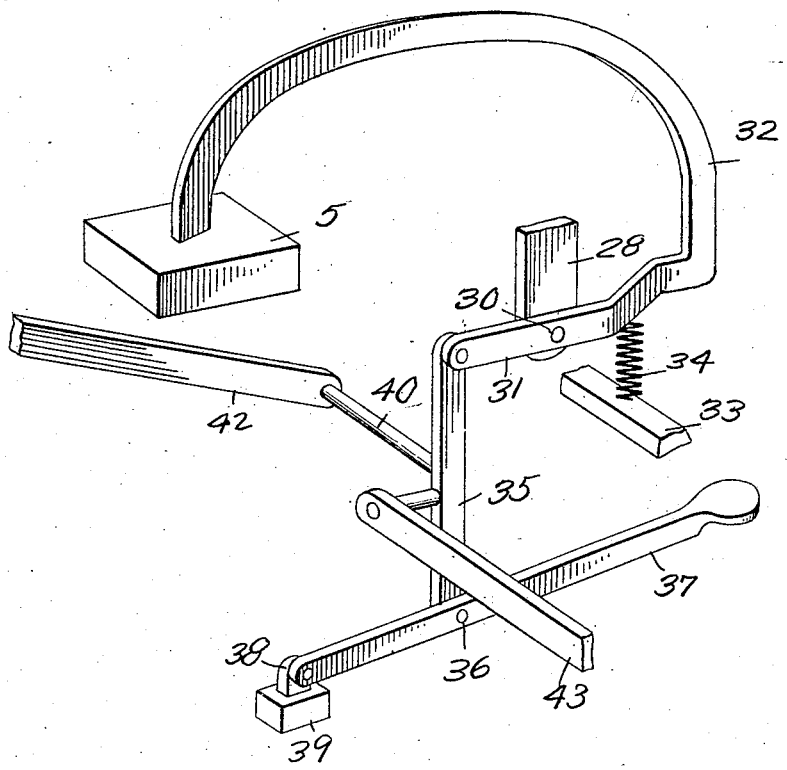
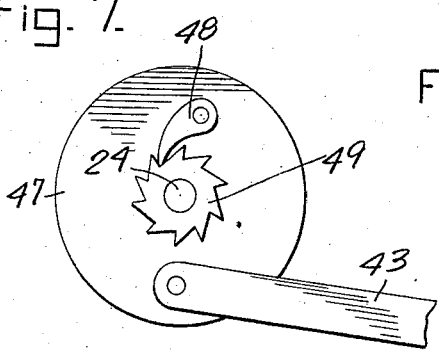
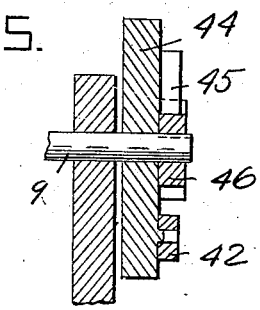
Witnesses
G. R. Thomas
Inventor
H. W. Buchanan
By Chandler & Chandler
Attorneys

UNITED STATES PATENT OFFICE.

HAROLD W. BUCHANAN, OF MINNEAPOLIS, MINNESOTA.

MACHINE FOR STAMPING ENVELOPS.

No. 884,263.  Specification of Letters Patent.  Patented April 7, 1908.

Application filed April 11, 1907. Serial No. 367,571.

*To all whom it may concern:*

Be it known that I, HAROLD W. BUCHANAN, a citizen of the United States, residing at Minneapolis, in the county of Hennepin, State of Minnesota, have invented certain new and useful Improvements in Machines for Stamping Envelops; and I do hereby declare the following to be a full, clear, and exact description of the invention, such as will enable others skilled in the art to which it appertains to make and use the same.

This invention relates to new and useful improvements in machines for stamping envelops, and it has particular reference to a machine of this class including means for feeding a sealing strip or sheet, means for cutting said strip, and means for affixing the portion cut from the strip to an envelop passed therebeneath.

In connection with a machine of the above class the invention aims as a primary object to provide novel means for feeding the envelops to be stamped and the sealing strips simultaneously with the movement of the cutting and stamping plunger in the accomplishment of its function.

The details of construction will appear in the course of the following description, in which reference is had to the accompanying drawings forming a part of this specification, like characters designating similar parts throughout the several views, wherein:

Figure 1 is a side elevation of a machine constructed in accordance with the present invention. Fig. 2 is a top plan view thereof. Fig. 3 is a section on the line 3—3 of Fig. 2, showing the feeding table for the sealing strip, and the associated parts thereof. Fig. 4 is a detailed perspective view of the operating lever and its connection with the various correlated mechanisms. Fig. 5 is a section on the line 5—5 of Fig. 2, illustrating in detail the connection between the operating lever and the pulley of the envelop conveyer, the same connection being likewise employed between the operating lever and the reel upon which the sealing strip is carried. Fig. 6 is a detailed plan view of the strip from which the sealing sheets are cut by mechanism to be described hereinafter. Fig. 7 is an enlarged detailed side elevation of the connection illustrated in section in Fig. 5.

Referring specifically to the accompanying drawings the numeral 1 designates a table formed with a transverse recess 2 in its upper surface, the envelop conveyer 3, preferably an endless apron having movement through said recess. The transverse sides of the recess 2 are defined by parallel knives 4, having sharpened upper edges and coacting in the function of cutting the sealing sheets or "stickers" with a plunger 5, movable into the recess 2. A receptacle 6 for water to moisten the gum underneath surface of the sealing sheets is embedded in the table 1 rearwardly of the recess 2 and a ground glass roller 7 is mounted for rotation in said receptacle transversely thereof. The table 1 is provided at its rear end with vertically extending parallel bracket bearings 8, in which is journaled the ends of a transverse shaft 9, the latter carrying a reel 10 upon which the sealing strip 11 is wound and from which it is unwound during the action of the machine. The strip 11 from the reel 10 is passed over a transverse guide pulley 12 having its shaft 13 journaled in the lower part of the brackets 8 and from the pulley 12 it is passed longitudinally over the table 1 and over a similar pulley 14, the shaft 15 of which has its ends journaled in the lower part of bracket bearing 16, in the upper ends of which a transverse shaft 17 is journaled, the latter carrying a reel 18 upon which the strip 11 is wound during the action of the machine. The shaft 17 has one end projected beyond the bearing 16 at one side thereof and a weight 19 is suspended by a cord or cable 20 from the projecting end of the shaft 17, the gravity of the weight serving to rotate the reel 17 and feed the strip when the reel 10 is released by an escapement mechanism to be later described. The conveyer 3 is of the endless belt type and is trained over supporting pulleys 21 and 22, the respective shafts 23 and 24 of which have their ends journaled in bracket bearings 25, supported from the floor or from a suitable stationary object. The conveyer 3 in its action passes beneath an open ended vertical envelop magazine 26 in which the envelops 27 are disposed in superimposed relation, the envelops being fed by gravity individually and successively upon the conveyer 3 as it passes therebeneath, this action being well known.

The table 1 is provided with a depending bracket 28 in the lower end of which, is pivoted, as at 30, a horizontal portion 31 of a plunger lever 32, the latter extending upwardly on one side of the table 1, and having its upper end curved, so that the plunger 5 carried thereby overhangs the recess 2. Beneath the lever 32 a bar 33 is supported transversely of the table and a retractile spring 34 has its ends connected to said bar and to the horizontal bar 31 forwardly of the pivot thereof, the spring 34 serving by its energy to support the plunger 5 normally out of the recess 2. The horizontal portion 31 at its rear end has pivotal connection with a link 35, the latter being pivoted, as at 36, between the ends of a foot lever 37, the rear end of which is pivoted to a bracket 38 mounted upon a transverse bar 39 supported by the table frame. The link 35 is provided with angularly extending horizontal arms 40 and 41 which afford pivot pins for the lower ends of respective links 42 and 43. The link 42 has eccentric pivotal connection with a disk 44 mounted upon the projecting end of the shaft 9, said disk being loose on said shaft and carrying a gravity pawl 45 for engagement with the teeth of a ratchet wheel 46, the latter being fast on said shaft. In like manner the link 43 has eccentric pivotal connection with a disk 47 loosely mounted on the projecting end of the shaft 24, the disk 47 carrying a gravity pawl for engagement with the teeth of a ratchet wheel 49, the latter being fast on said shaft.

The construction of the strip 11 is shown in detail in Fig. 6 in which it will be noted that said strip is provided with imperforate side portions 50 having two parallel longitudinal lines of weakness or perforations 51 and transverse lines of weakness or perforations 52 extending between the lines 51 at regular intervals, the lines 51 and 52 being so spaced that the imperforate portions 53 occurring therebetween, and which constitute the sealing sheets or "stickers" above referred to are of the proper size previously determined by the user.

The operation will be readily understood from the foregoing description. When the lever 37 is depressed by the operator the plunger 5, through the connections described is moved downwardly into the recess 2. The plunger 5 is coextensive in area with the sheets 53 and in its downward movement it coacts with the knives 4 to sever said sheets from the imperforate portions 50, the latter affording a continuous web between the reels 10 and 18. As the plunger 5 is moving downwardly the link 35 likewise moves downwardly and through the medium of the links 42 and 43 and the pawl and ratchet mechanism above described and illustrated in detail in Figs. 5 and 7 simultaneously releases the reel 10 and the pulley 21, the latter constituting a drive pulley for the conveyer 3. In this action the conveyer 3 is advanced to bring an envelop beneath the plunger 5 and the strip 11 is simultaneously advanced in like manner, the weight 19 constituting a positive feeding means for said strip. When the lever 37 is released, the spring 34 restores the parts to their normal position, the reel 10 and pulley 21 being without action in this movement, since the pawls 45 and 48 will ride over their respective ratchets 46 and 49. The operation above described is continued *ad infinitum*.

From the foregoing description it will be seen that simple and efficient means are provided for accomplishing the objects of the invention, but, while the elements herein shown and described, are well adapted to serve the functions set forth, it is obvious that various minor changes may be made in the proportions, shape and arrangement of the several parts without departing from the spirit and scope of the invention as defined in the appended claims.

What is claimed, is:

A machine of the type set forth comprising a table, a reel mounted thereon, cutting knives provided on said table, a foot lever, an operating lever, a connection between said foot lever and said operating lever, a plunger carried by said operating lever above said knives, a belt movable transversely of said table beneath said plunger, supporting pulleys beneath said belt, a connection between said first named connection and said reel for operating the latter upon operative movement of said plunger, a connection between said first named connection and said pulley for operating the latter upon operative movement of said plunger, and a spring engaging said operating lever to restore the parts to initial position after each operation thereof.

In testimony whereof, I affix my signature, in presence of two witnesses.

HAROLD W. BUCHANAN.

Witnesses:
 GEO. B. PENNEY,
 C. W. BRAGG.